US008732762B2

(12) United States Patent
Maruyama et al.

(10) Patent No.: US 8,732,762 B2
(45) Date of Patent: May 20, 2014

(54) INFORMATION PROVIDING APPARATUS, INFORMATION ACQUISITION TERMINAL, BROADCAST RECEPTION TERMINAL, INFORMATION PROVIDING SYSTEM, INFORMATION PROVIDING METHOD AND PROGRAM

(75) Inventors: Tetsuo Maruyama, Tokyo (JP); Tetsu Sumita, Tokyo (JP); Kaori Wada, Tokyo (JP)

(73) Assignees: Sony Corporation (JP); Plat-Ease Corporation (JP)

( * ) Notice: Subject to any disclaimer, the term of this patent is extended or adjusted under 35 U.S.C. 154(b) by 711 days.

(21) Appl. No.: 12/378,208

(22) Filed: Feb. 12, 2009

(65) Prior Publication Data
US 2009/0210905 A1     Aug. 20, 2009

(30) Foreign Application Priority Data

Feb. 14, 2008 (JP) ................................ P2008-033644

(51) Int. Cl.
*G06F 3/00* (2006.01)
*G06F 13/00* (2006.01)
*H04N 5/445* (2011.01)
*H04N 21/231* (2011.01)

(52) U.S. Cl.
CPC .............................. *H04N 21/23109* (2013.01)
USPC ........................................................... 725/51

(58) Field of Classification Search
USPC .................................... 725/42, 58; 348/734
See application file for complete search history.

(56) References Cited

U.S. PATENT DOCUMENTS

| 7,344,084 B2* | 3/2008 | DaCosta | 235/472.01 |
| 7,904,939 B2* | 3/2011 | Durden et al. | 725/153 |
| 2005/0278745 A1* | 12/2005 | Fukuda et al. | 725/55 |
| 2006/0212906 A1* | 9/2006 | Cantalini | 725/62 |
| 2007/0136753 A1* | 6/2007 | Bovenschulte et al. | 725/46 |
| 2008/0077961 A1* | 3/2008 | Takemoto | 725/58 |
| 2008/0271078 A1* | 10/2008 | Gossweiler et al. | 725/40 |

FOREIGN PATENT DOCUMENTS

| JP | 2003169312 A | 6/2003 |
| JP | 2005033600 A | 2/2005 |
| JP | 2005244878 A | 9/2005 |
| WO | 2007070422 A3 | 8/2007 |

OTHER PUBLICATIONS

Office Action from Japanese Application No. 2008-033644, dated Jul. 31, 2012.

* cited by examiner

*Primary Examiner* — Nathan Flynn
*Assistant Examiner* — Omar S Parra
(74) *Attorney, Agent, or Firm* — Lerner, David, Littenberg, Krumholz & Mentlik, LLP

(57) ABSTRACT

An ECG server, which provides program contents-related ECG information to a television terminal and a user terminal, comprises a storage unit that stores the program contents-related ECG information, a configuring unit that configures an ECG module in correspondence to the program contents, made up with a plurality of sets of ECG information including tuning information to be used to allow the television terminal to select the program contents, a setting unit that sets timing information, which will allow the ECG module to be provided to the user terminal by linking with consignment of the program contents and a providing unit that provides, in conformance to the timing information, the ECG module to an user terminal capable of providing the tuning information to the television terminal. By utilizing the ECG server, the ratings of the program contents can be improved and the program contents can be more easily selected.

17 Claims, 10 Drawing Sheets

FIG.6

| PROGRAM CONTENT | | ECG MODULE | |
|---|---|---|---|
| TIME SLOT INFORMATION | PROGRAM RAW MATERIAL | TIMING INFORMATION | MODULE |
| 19:00 – 19:03 | TITLE RAW MATERIAL | 19:00 – 19:02 | ECG MODULE (FOR PROGRAM TITLE RAW MATERIAL) |
| | | 19:03 | ECG MODULE (GENERAL-PURPOSE) |
| 19:03 – 19:04 | CM1 RAW MATERIAL | 19:03 – 19:04 | ECG MODULE (FOR CM1 RAW MATERIAL) |
| 19:04 – 19:05 | CM2 RAW MATERIAL | 19:04 – 19:05 | ECG MODULE (FOR CM2 RAW MATERIAL) |
| | | 19:05 – 19:06 | ECG MODULE (GENERAL-PURPOSE) |
| 19:05 – 19:13 | MAIN PROGRAM RAW MATERIAL | 19:06 – 19:09 | ECG MODULE (FOR MAIN PROGRAM RAW MATERIAL 1) |
| | | 19:09 – 19:13 | ECG MODULE (GENERAL-PURPOSE) |
| 19:13 – 19:14 | CM3 RAW MATERIAL | 19:13 – 19:14 | ECG MODULE (FOR CM3 RAW MATERIAL) |
| 19:14 – 19:15 | CM4 RAW MATERIAL | 19:14 – 19:15 | ECG MODULE (FOR CM4 RAW MATERIAL) |
| 19:15 – 19:16 | PROGRAM PROMOTION 1 RAW MATERIAL | 19:15 – 19:16 | ECG MODULE (FOR PROGRAM PROMOTION 1 RAW MATERIAL) |
| | | 19:16 – 19:20 | ECG MODULE (GENERAL-PURPOSE) |
| 19:16 – 19:24 | MAIN PROGRAM RAW MATERIAL 2 | 19:20 – 19:23 | ECG MODULE (FOR MAIN PROGRAM RAW MATERIAL 2) |
| | | 19:23 – 19:24 | ECG MODULE (GENERAL-PURPOSE) |
| 19:24 – 19:25 | CM5 RAW MATERIAL | 19:24 – 19:25 | ECG MODULE (FOR CM5 RAW MATERIAL) |
| 19:25 – 19:26 | CM6 RAW MATERIAL | 19:25 – 19:26 | ECG MODULE (FOR CM6 RAW MATERIAL) |
| 19:26 – 19:27 | PROGRAM PROMOTION 2 RAW MATERIAL | 19:26 – 19:27 | ECG MODULE (FOR PROGRAM PROMOTION 2 RAW MATERIAL) |
| | | 19:27 – 19:28 | ECG MODULE (GENERAL-PURPOSE) |
| 19:27 – 19:30 | ENDING RAW MATERIAL | 19:28 – | ECG MODULE (FOR ENDING RAW MATERIAL) |

INFORMATION PROVIDING APPARATUS, INFORMATION ACQUISITION TERMINAL, BROADCAST RECEPTION TERMINAL, INFORMATION PROVIDING SYSTEM, INFORMATION PROVIDING METHOD AND PROGRAM

CROSS-REFERENCE TO RELATED APPLICATION

The present application claims priority from Japanese Patent Application No. JP 2008-033644, filed in the Japanese Patent Office on Feb. 14, 2008, the entire content of which is incorporated herein by reference.

BACKGROUND OF THE INVENTION

1. Field of the Invention

The present invention relates to an information providing apparatus, an information acquisition terminal, a broadcast reception terminal, an information providing system, an information providing method and a program.

2. Description of the Related Art

Today, increasingly diverse television program contents are provided through various broadcasting media including terrestrial broadcast, BS (broadcast satellite), CS (communication satellite) broadcast and CATV (common antenna television) broadcast. While the broadcasters that provide program contents content strive to offer more entertaining program contents so as to improve the ratings, the user, i.e., the viewer of program contents, may sometimes find the program contents selection process time-consuming and tedious.

Program promotion information is provided through print media, electronic media and the like in the related art. In more specific terms, program promotion information may be provided in printed media such as the TV program contents guide section of the newspaper and television guide information magazines, whereas it may be provided in electronic media as it is broadcast during a television program contents, installed in a homepage or the like. Such program promotion information provided in the conventional media described above has been proven to be somewhat effective in improving the program contents ratings and assuring better user convenience in program contents selection.

SUMMARY OF THE INVENTION

However, there is still room for improvement both with regard to program contents ratings and the ease with which the user is able to select program contents to view. The program promotion information provided through the conventional channels as described above does not address the following issues effectively.

Firstly, the program promotion information may not always be readily accessible. Namely, the user can view program promotion information provided in a printed medium only if the printed medium is present near the user. In addition, program promotion information spot broadcast during a television program contents can be accessed only if a television terminal or the like is present around the user and the user happens to be viewing the particular television program contents.

Secondly, there is an issue related to the timing with which program promotion information is provided. In order to maximize the promotion effect, the program promotion information in the related art must be provided with optimal timing, e.g., immediately before the particular program contents is to be aired or while the program contents is on the air. Namely, the program promotion information cannot yield the maximum promotion effect unless it is provided in a timely manner.

Thirdly, there is an issue concerning the channel selection operation performed by the user. The user having viewed the program promotion information provided in a conventional medium needs to take specific viewer action such as selecting a channel at a television terminal in order to choose the particular program contents among numerous program contents options. This means that unless a tool through which the user, having viewed the program promotion information, is smoothly guided into the channel selection operation, is in place, the user cannot be efficiently enticed into watching the program contents.

Unless the issues of program promotion information provided through conventional media are properly addressed, no further improvement in either the program contents ratings or the ease with which the user is able to select program contents can be achieved.

Thus, it is desirable to provide an information provision apparatus, an information acquisition terminal, a broadcast reception terminal, an information provision system, an information provision method and a program, with which both the program contents ratings and the ease of program contents selection can be improved.

According to a first embodiment of the present invention, there is provided an information providing apparatus that is capable of connecting, via a communication network, with a broadcast information reception terminal, which obtains and displays program contents and program contents-related electronic contents guide (ECG) information related to the program contents, and with an information acquisition terminal, which obtains and displays the contents-related ECG information, and provides the contents-related ECG information to the broadcast reception terminal and the information acquisition terminal. The information providing apparatus comprises an ECG information storage unit that stores the program contents-related ECG information correlated to the program contents, an ECG module configuring unit that configures an ECG module in correspondence to the program contents, made up with a plurality of sets of ECG information including ECG information containing tuning information to be used to allow the broadcast reception terminal to select the program contents, a timing information setting unit that sets timing information that will allow the ECG module corresponding to the program contents to be provided to the information acquisition terminal by linking (interlocking) with consignment of the program contents to the broadcast reception terminal, and an ECG module providing unit that provides, in conformance to the timing information, the ECG module corresponding to the program contents to the information acquisition terminal capable of providing the tuning information to the broadcast reception terminal.

The information providing apparatus structured as described above provides the ECG module related to the program contents to the information acquisition terminal, allowing the user to easily view the ECG information offered as program promotion information. In addition, since the ECG module is provided to the information acquisition terminal based upon the timing information so as to link with the consignment of the program contents to the broadcast reception terminal, the program promotion information can be provided to the user with optimal timing. Furthermore, the user is prompted to perform a channel selection operation based upon the tuning information to be used to choose program contents, provided as part of the ECG module, making it possible to efficiently guide the user into program contents viewing. As a result, with the issues in the related art such as access to program promotion information, the timing with which the program promotion information is provided and the channel selection operation by the user effectively addressed, the program contents ratings information can be improved and better convenience for the user wishing to select program contents are assured.

The ECG module may include a plurality of sets of ECG information and correlating information that correlates the plurality of sets of ECG information to the program contents, and display control for the plurality of sets of ECG information may be enabled through user operation performed on the information acquisition terminal-side and on the broadcast reception terminal side. Through these measures, the ECG information can be more easily viewed and searched, improving access to the program promotion information.

The timing information setting unit may set the timing information based upon ratings information pertaining to the program contents. In this case, the ECG module is provided in conformance to the timing information set based upon the ratings information, allowing the ECG information to entice the viewer with better effect.

The ECG module configuring unit may configure the ECG module related to the program contents based upon ratings information pertaining to the program contents. Since an ECG module that has been configured based upon the ratings information is provided, the user can be more effectively enticed into viewing the program contents by the ECG information.

The timing information setting unit may update the timing information based upon ratings history information pertaining to the program contents. In this case, the ECG module is provided in conformance to the timing information updated based upon the ratings history information, allowing the ECG information to entice the user into viewing the program contents with even better effect.

The ECG module configuring unit may reconfigure the ECG module based upon ratings history information pertaining to the program contents. Since the ECG module is reconfigured based upon the ratings history information, the user can be enticed into viewing the program contents by the ECG information with even better effect.

The information providing apparatus may further comprise an ECG information pre-processing unit that pre-processes ECG information included in the ECG module before providing the ECG module, so as to optimize the ECG module to the processing capability of the information acquisition terminal to which the ECG module is to be provided. Since the ECG module is provided to the information acquisition terminal with the ECG information contained therein having been preprocessed so as to optimize the ECG module to the processing capability of the information acquisition terminal, the ECG information can be seen more easily.

According to a second embodiment of the present invention, there is provided an information acquisition terminal that is included in an information providing system allowing a broadcast reception terminal, which obtains and displays program contents and program contents-related electronic contents guide (ECG) information related to the program contents, and the information acquisition terminal to connect, via a communication network, with an information providing apparatus offering the program contents-related ECG information, and displays the program contents-related ECG information obtained from the information related to the program contents, originated from the information providing apparatus. The information acquisition terminal comprises an ECG module acquisition unit that obtains from the information providing apparatus an ECG module made up with a plurality of sets of ECG information, which include ECG information containing tuning information to be used to allow the broadcast reception terminal to select the program contents, in conformance to timing information set so as to provide the ECG module to the information acquisition terminal by linking with consignment of the program contents to the broadcast reception terminal, a display control unit that controls display of ECG information in the ECG module having been obtained and a tuning information providing unit that provides, in response to a user operation, the tuning information included in the obtained ECG module to the broadcast reception terminal capable of selecting the program contents based upon the tuning information.

At the information acquisition terminal structured as described above, the ECG module related to the program contents are obtained from the information providing apparatus and thus, the user is able to easily access the ECG information provided as program promotion information. In addition, since the ECG module is obtained from the information providing apparatus in conformance to the timing information so as to link the acquisition with consignment of the program contents to the broadcast reception terminal, the user is able to obtain the program promotion information with optimal timing. Since the program contents tuning information is obtained as part of the ECG module, the user is able to select and view with ease the program contents simply by performing a channel selection operation based upon the tuning information.

The information acquisition terminal may further comprise an identification information acquisition/providing unit that obtains from the broadcast reception terminal identification information used to identify ECG information currently under display control at the broadcast reception terminal and provides identification information used to identify ECG information currently under display control by the display control unit to the broadcast reception terminal capable of controlling display of ECG information corresponding to the identification information in response to a user operation, so as to allow the display control unit to control display of the ECG information corresponding to the obtained identification information. These measures allow ECG information to be viewed and searched with better ease both at the information acquisition terminal and the broadcast reception terminal and, as a result, the accessibility to the program promotion information is improved.

The information acquisition terminal may further comprise an ECG information preprocessing unit that preprocesses ECG information included in the ECG module having been obtained so as to optimize the ECG module to the processing capability of the information acquisition terminal, before executing display control for the ECG information in the ECG module. Since the obtained ECG information is thus preprocessed so as to achieve an optimal match to the processing capability of the information acquisition terminal, access to the ECG information is improved.

According to a third embodiment of the present invention, there is provided a broadcast reception terminal that is included in an information providing system allowing an information acquisition terminal, which obtains and displays electronic contents guide (ECG) information from an information providing apparatus, and the broadcast reception terminal to connect, via a communication network, with the information providing apparatus offering program contents-related ECG information related to program contents, and obtains and displays the program contents and the program contents-related ECG information. The broadcast reception terminal comprises an ECG module acquisition unit that obtains from the information providing apparatus an ECG module related to the program contents and made up with a plurality of sets of ECG information including ECG information containing tuning information to be used to allow the broadcast reception terminal to select the program contents, a tuning information acquisition unit that obtains in response to a user operation performed at the information acquisition terminal, tuning information included in an ECG module, which is provided from the information providing apparatus to the information acquisition terminal in conformance to timing information set so as to provide the ECG module to the information acquisition terminal by linking with consignment of the program contents to the broadcast reception terminal, a program contents tuning unit that selects the program contents based upon the tuning information having been obtained, and a display control unit that controls display of the program contents and ECG information included in the ECG module obtained from the information providing apparatus.

The structure described above allows the ECG module made up with a plurality of sets of ECG information related to specific program contents to be obtained at the information acquisition terminal in conformance to the timing information so as to link with consignment of the program contents to the broadcast reception terminal. The tuning information obtained as part of the ECG module is then provided to the broadcast reception terminal in response to a user operation performed on the information acquisition terminal side and the program contents are selected based upon the tuning information thus provided. As a result, the user is able to select and view the program contents with ease simply by performing the channel selection operation based upon the tuning information.

The broadcast reception terminal may further comprise an identification information acquisition/providing unit that obtains from the information acquisition terminal identification information used to identify ECG information currently under display control by the information acquisition terminal and provides identification information used to identify ECG information currently under display control at the display control unit to the information acquisition terminal capable of controlling display of ECG information corresponding to the identification information in response to a user operation, so as to allow the display control unit to control the display of the ECG information corresponding to the identification information having been obtained. These measures allow ECG information to be viewed and searched with better ease both at the information acquisition terminal and the broadcast reception terminal and, as a result, the accessibility to the broadcast promotion information is improved.

According to a fourth embodiment of the present invention, there is provided an information providing system comprising the information providing apparatus in the first embodiment of the present invention, the information acquisition terminal in the second embodiment of the present invention and the broadcast reception terminal in the third embodiment of the present invention.

According to a fifth embodiment of the present invention, there is provided an information providing method adopted in the information providing system in the fourth embodiment of the present invention.

According to a sixth embodiment of the present invention, there is provided a program that enables a computer to execute the information providing method in the fifth embodiment of the present invention.

According to the embodiments of the present invention described above, an information providing apparatus, an information acquisition terminal, a broadcast reception terminal, an information providing system, an information providing method and a program, which improve the program contents ratings and assure better user convenience to a user wishing to select program contents, are provided.

BRIEF DESCRIPTION OF THE DRAWINGS

FIG. 6 illustrates the timing information setting processing executed in an example of broader application;

DETAILED DESCRIPTION OF THE PREFERRED EMBODIMENT

Figure 1:
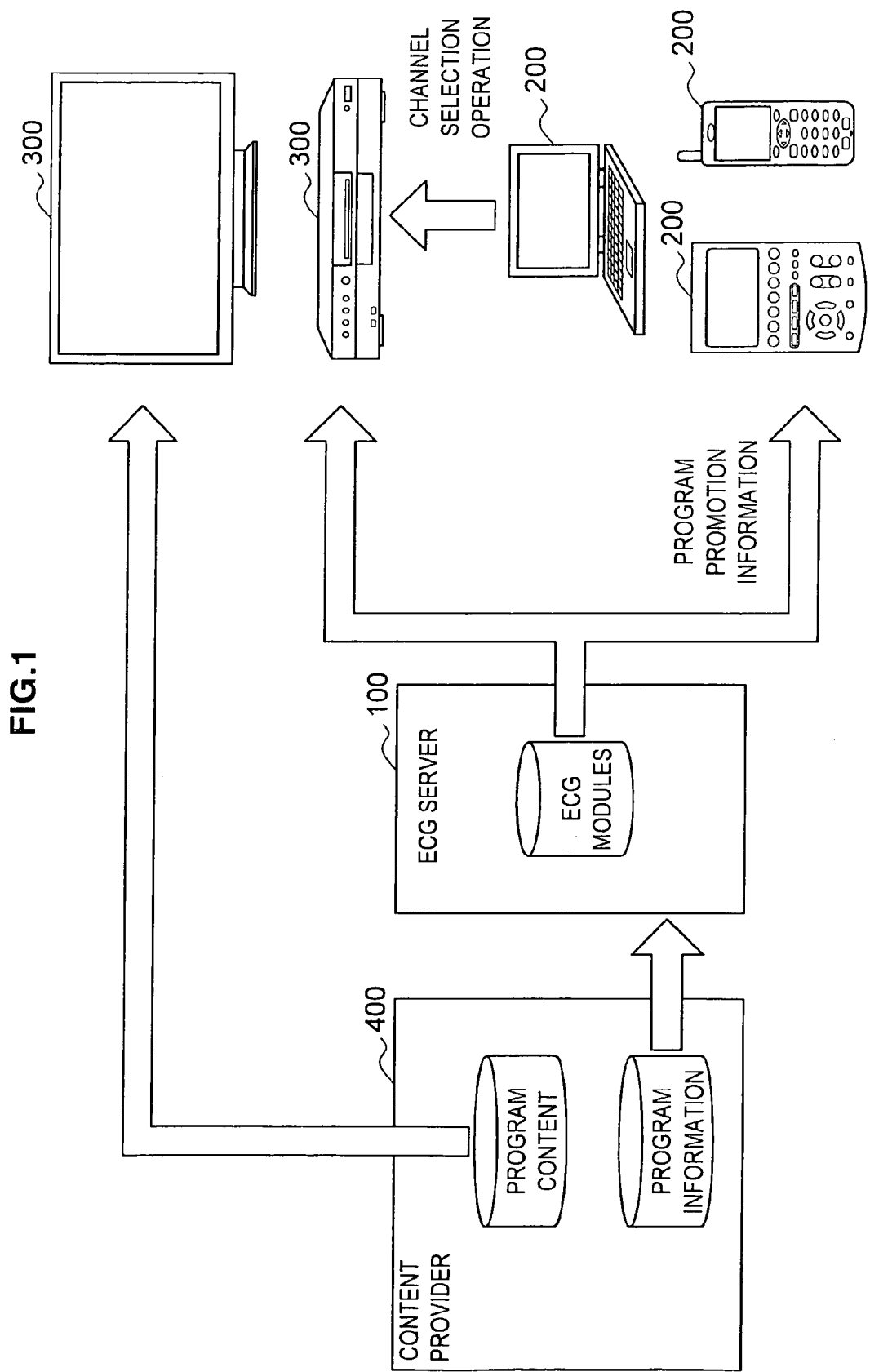
FIG. 1 is a conceptual illustration of the overall structure of the information providing system achieved in an embodiment of the present invention.

Hereafter, a preferred embodiment of the present invention will be described in detail with reference to the appended drawings. Note that, in the specification and the appended drawings, structural elements that have substantially the same functions and structures are denoted with the same reference numerals and repeated explanation of these structural elements is omitted.

(Overall Structure of the Information Providing System)

FIG. 1 is a conceptual illustration of the overall structure adopted in the information providing system achieved in an embodiment of the present invention. As shown in FIG. 1, the information providing system comprises an ECG (electronic contents guide) service provider (hereafter may be referred to as an "ECG server" (information providing apparatus)) 100, a user terminal 200 (information acquisition terminal), a television terminal 300 (broadcast reception terminal) and a contents provider 400.

The contents provider 400 provides program contents to the television terminal 300 and provides program contents information to the ECG server 100. The ECG server 100 registers and manages program contents information as ECG information and provides an ECG module constituted with a plurality of sets of ECG information to the user terminal 200 and the television terminal 300 via a communication network. The user terminal 200 obtains the ECG module from the ECG server 100 via the communication network and brings up ECG information included in the ECG module on display.

The television terminal 300, at which program contents obtained from the contents provider 400 via an antenna or the like, are displayed, obtains the ECG module from the ECG server 100 via the communication network and displays the ECG information included in the ECG module.

The ECG server 100 provides ECG modules each constituted with a plurality of sets of ECG information related to specific program contents to the user terminal 200 where the ECG modules are used as program promotion information. The user terminal 200 is an information processing terminal normally present in a typical user's life and is capable of providing the user with information in a form that allows easy access, such as a personal computer, a portable telephone or a remote controller for the television terminal 300.

The ECG server 100 provides an ECG module to the user terminal 200 in conformance to timing information set so as to provide the ECG module by linking with consignment of the program contents from the contents provider 400 to the television terminal 300. The term "timing information" in this context refers to information set based upon the date/time at which the program contents are available, the level of relevance of the program contents to public interest at the current time, the other competing program contents offered in the same time slot and the like. The timing information is set so as to entice the user into viewing the program contents by providing the ECG information with optimal timing. The timing information may also be set based upon program contents ratings information, and may be set to indicate, for instance, the timing with which the ratings are expected to improve during the program contents or the timing with which the higher ratings have been verified.

The ECG server 100 provides to the user terminal 200 the tuning information used to select the program contents, as part of the ECG module. The term "tuning information" in this context refers to information that enables the television terminal 300 to access the program contents, which is provided from the user terminal 200 in response to a user operation to a television terminal 300 capable of selecting the program contents based upon the information.

Figure 2:
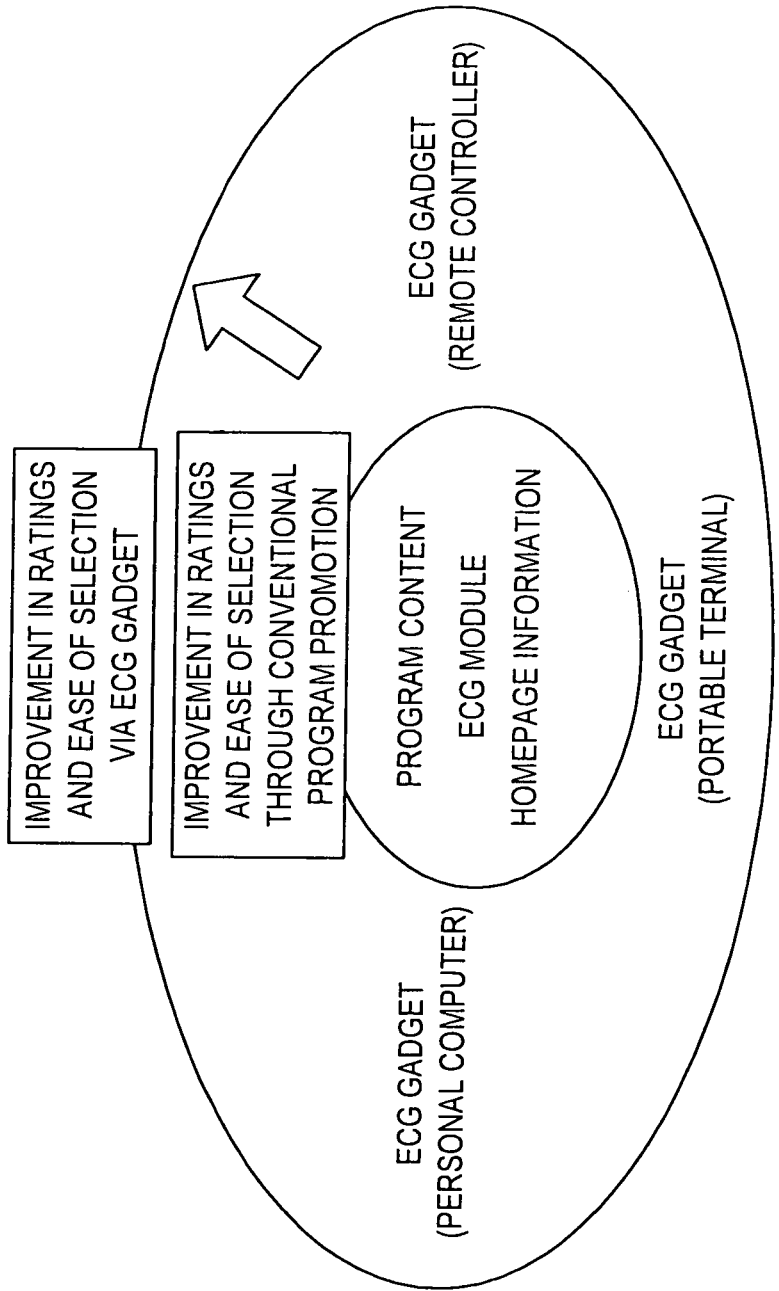
FIG. 2 illustrates how program contents ratings may be improved and the program contents may be selected with better ease through the information providing system.

FIG. 2 illustrates how the program contents ratings may be improved and better convenience for the user wishing to select the program contents may be assured through the information providing system.

As shown in FIG. 2, the information providing system allows the user to access ECG modules (gadgets) constituting program promotion information via the user terminal 200 present in a typical user's life, in addition to the program promotion information provided through conventional media. Since the ECG modules function as a tool for providing the program promotion information to the user in a timely manner, the likelihood of the user viewing the promotion information related to the program contents increases.

In addition, the information providing system allows the user to use the tuning information provided as part of the ECG module (gadget) constituting the program promotion information. Since the ECG module thus functions as a tool for smoothly guiding the user viewing the program promotion information to a channel selection operation, the user can be efficiently enticed into viewing the program contents.

Through the information providing system described above, with the issues in the related art concerning access to program promotion information, the timing with which the program promotion information is provided and the channel selection operation by the user are effectively addressed, and the program contents ratings can be improved and better convenience for the user wishing to select the program contents are assured.

Figure 3:
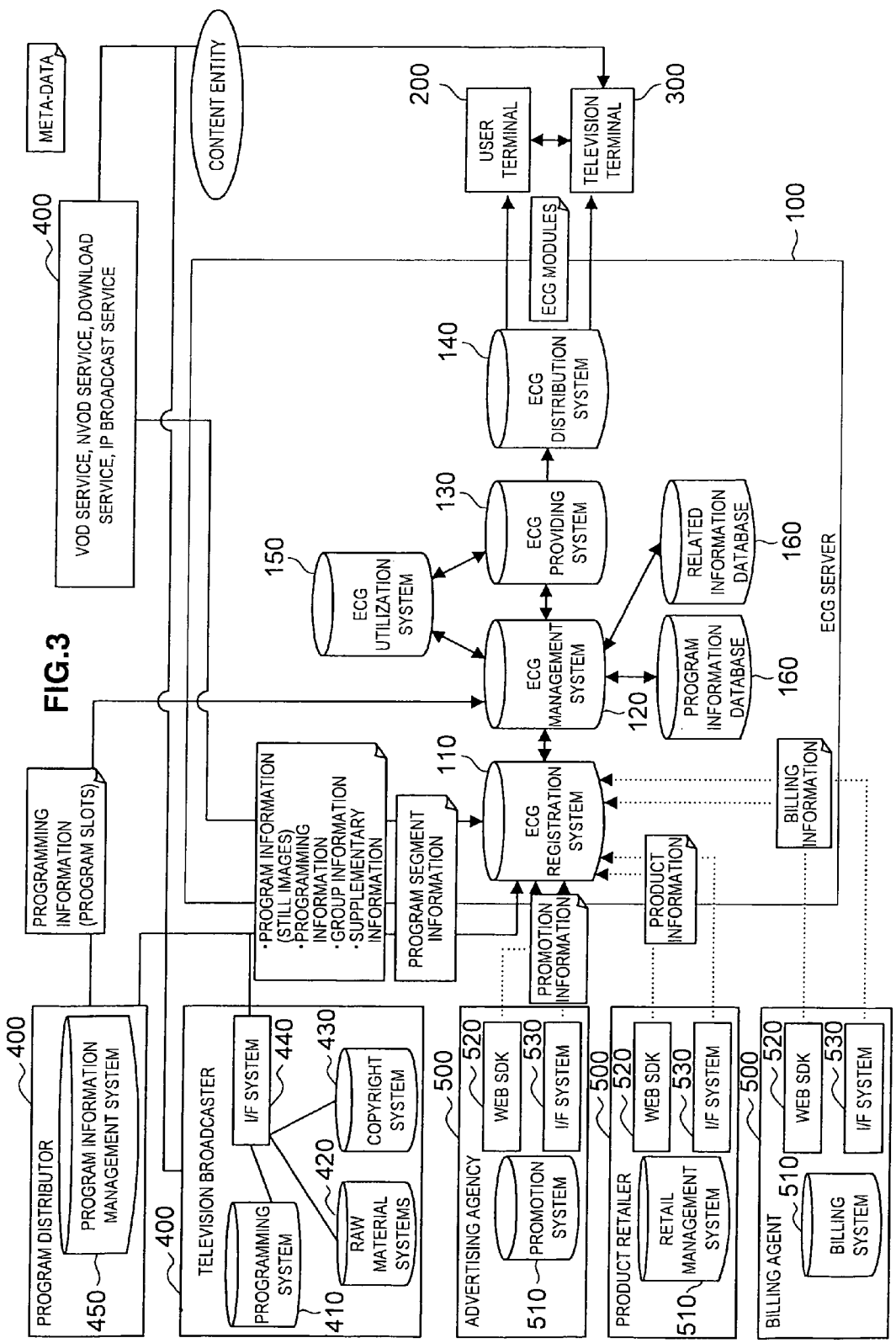
FIG. 3 is an illustration presenting an overall configuration model of the information providing system.

FIG. 3 presents an example of an overall configuration model for the information providing system. As shown in FIG. 3, the information providing system includes the ECG server 100, the user terminal 200, the television terminal 300, contents providers 400 and sponsors 500. It is to be noted that the information providing system includes at least one user terminal 200 and at least one television terminal 300.

The contents providers 400 are broadcast providers that may be, for instance, television stations, data broadcasters or program contents distributors. A contents provider 400 utilizes various systems for managing different types of program contents information, such as a programming system 410, a raw material system 420, a rights system 430 and an interface (I/F) system 440. The contents provider 400 provides program contents, data broadcast information and EPG-SI (electronic program contents guide-service information) information to the television terminal 300 and provides various types of program contents information to the ECG server 100.

The program contents information includes, for instance, EPG (electronic program contents guide) information, programming information, program contents format information, cue sheet information, photo • logo information, program promotion information and rights information. It is to be noted that the program contents format information defines program contents frames such as the main program contents, commercials and program contents promotions, whereas the cue sheet information allocates program contents raw material to specific program contents frames.

The sponsors 500 include promotion agencies, retail companies and billing agents that provide EC (electronic commerce) services such as promotion, retailing and billing. Under certain circumstances, a contents provider 400 that provides program contents may also be a sponsor. The sponsors 500 each utilize an information processing system 510, a web SDK (software development kit) 520 and an interface (I/F) system 530 and the like. The sponsors 500 provide various types of related information pertaining to program contents, such as promotion information and retail information to the user terminal 200 and the television terminal 300 via the ECG server 100.

(Structure of the ECG Server 100)

In reference to FIG. 3, the structure of the ECG server 100 operated by an information-providing service provider or the like is described. The ECG server 100 comprises an ECG registration system 110, an ECG management system 120, an ECG providing system 130, an ECG distribution system 140, an ECG utilization system 150, various databases 160 and the like.

The ECG registration system 110 registers as ECG information program contents information provided by the contents providers 400, including the basic program contents information, the programming information, the program contents format information, the cue sheet information and the available program contents list information, and related information provided by the sponsors 500 such as advertising information and retail information. The ECG registration system 110 attaches identification information to the program contents information and the related information and also selectively attaches attribute information indicating the attribute of each set of information before registering them as ECG information. The ECG registration system 110 functions as an ECG information storage unit or the like.

As detailed later, the ECG management system 120 manages a plurality of sets of registered ECG information as an ECG module corresponding to specific program contents. As detailed later, the ECG management system 120 creates a distribution schedule for ECG module distribution based upon the programming information, the program contents format information, the cue sheet information and the like. The ECG management system configures an ECG module by linking with the ECG providing system 130, and the ECG distribution system 140 and provides the ECG module to the user terminal 200 and the television terminal 300. The ECG management system 120 in the ECG server functions as an ECG module configuring unit, the timing information setting unit and the like.

The ECG providing system 130 and the ECG distribution system 140 provide and distribute an ECG module managed via the ECG management system 120 to the user terminal 200 and the television terminal 300 in conformance to the distribution schedule. The ECG providing system 130 and the ECG distribution system 140 function together as an ECG module providing unit and the like. The ECG utilization system 150 utilizes all the systems in the ECG server 100 by controlling the ECG management system 120 and the ECG providing system 130.

(Structure of the User Terminal 200)

The user terminal 200 is an information processing terminal normally present in a typical user's life, capable of providing information in a form that allows easy user access, such as a personal computer, a portable telephone or a PDA (personal digital assistant) unit. It is to be noted that the user terminal 200 may be a remote controller for the television terminal 300, equipped with a display device. The user terminal 200 may include, for instance, an operation unit, a communication unit, a display unit, a storage unit and a control processing unit.

Via the operation unit, which may include, for instance, operation devices such as a select button and an OK button operated to control the user terminal 200, enables the user to perform a viewing operation to view ECG information, a channel selection operation, a device switching operation and the like. The communication unit includes a communication device engaged in operation to communicate with the ECG server 100 and the television terminal 300 via a communication network. As described in detail later, an ECG module can be obtained from the ECG server 100, tuning information can be provided to the television terminal 300 and identification information used to identify ECG information can be exchanged with the television terminal 300 via the communication unit.

At the display unit, which includes a display device such as a liquid crystal panel, a monitor or the like, ECG information obtained from the ECG server 100 can be displayed. In the storage unit, various types of information such as a program contents used to control the user terminal 200 and processing data are stored. The control processing unit processes the ECG information and controls the overall functions of the user terminal 200. The control processing unit, which is to be described in detail later, enables ECG information display control, preprocessing of ECG information and the like.

(Structure of the Television Terminal 300)

The television terminal 300 may be, for instance, a standard television terminal 300, a CATV terminal, an IPTV (Internet protocol television) terminal or a PVR (personal video recorder). The television terminal 300 may instead be a portable telephone, a PDA unit, a personal computer, a portable terminal, a mobile terminal or the like.

The television terminal 300 engages in communication with an external system and an external device via a communication network through, for instance, optical fiber, ADSL (asymmetric digital subscriber line), telephone modem, power line, wireless system or the like. The television terminal 300 receives program contents provided through various transmission paths including terrestrial broadcasting, BS broadcasting, CS broadcasting, CATV broadcasting and optical fiber broadcasting, via an antenna, an STB (set top box) or the like. The television terminal 300 comprises an operation unit, a broadcast processing unit, an ECG information processing unit, a display unit and the like.

The operation unit, which includes an operation device such as a select button and an OK button operated to control the television terminal 300, enables the user to perform a viewing operation to view ECG information, a device switching operation and the like. Via the broadcast processing unit, specific program contents can be selected, program contents, data broadcast information and the like can be obtained and program contents can be selectively recorded and reproduced. The ECG information processing unit, which is to be described in detail later, enables ECG information display control, preprocessing of ECG information and the like.

The display unit, which includes a display device such as a liquid crystal panel, a monitor or the like, enables display of program contents obtained from a contents provider 400, display ECG information obtained from the ECG server 100 and the like. In a storage unit, various types of information including a program contents used to control the processing executed at the television terminal 300 and processing data, are stored.

(Structure of ECG Module)

Figure 4:
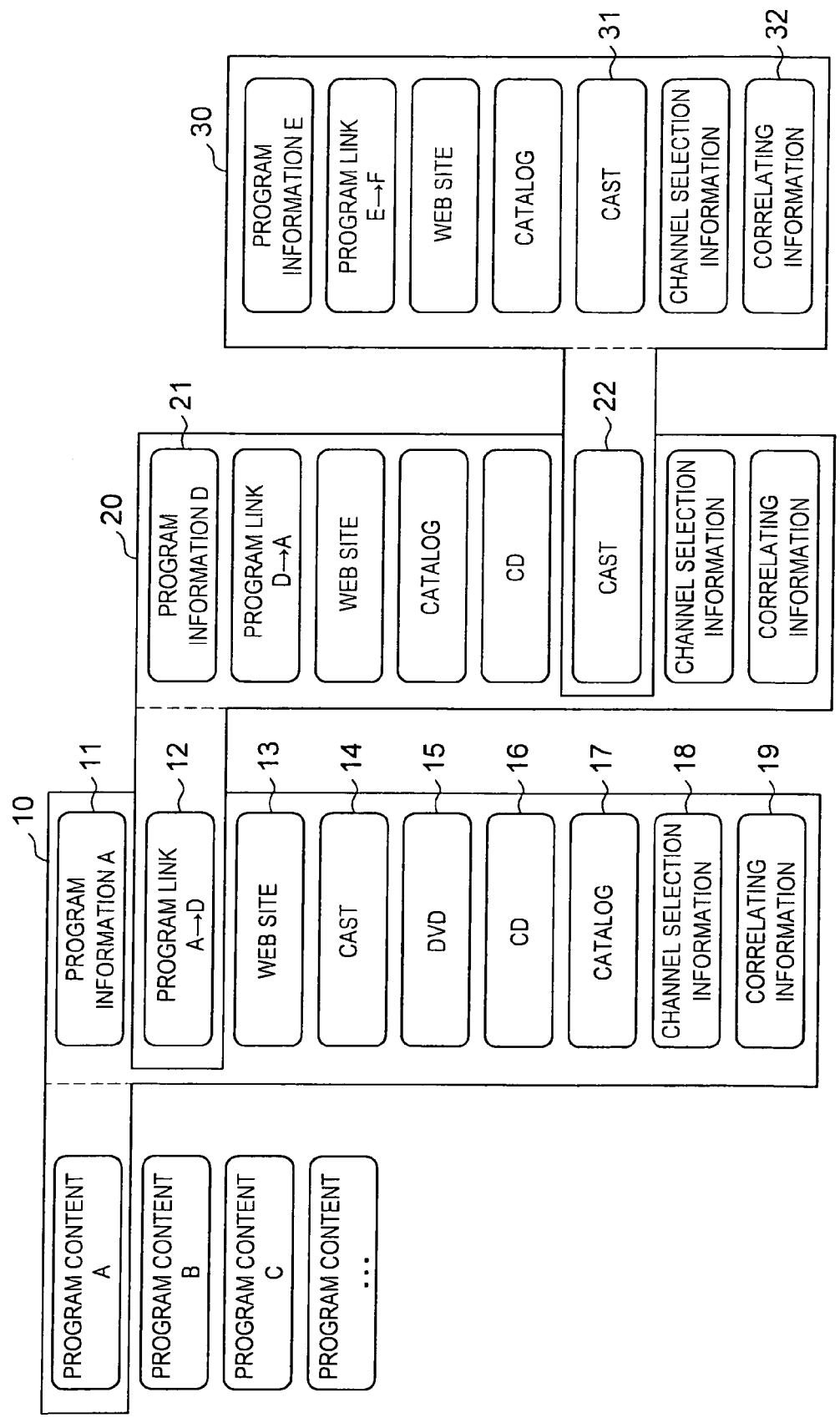
FIG. 4 is an illustration presenting a structural example for ECG modules

FIG. 4 illustrates the structure adopted in ECG modules. FIG. 4 shows ECG modules 10, 20 and 30 related to program contents A, D and E.

As shown in FIG. 4, the ECG modules are each configured in correspondence to a specific set of program contents, and each ECG module includes ECG information made up with program contents information, related information, tuning information and the like. The ECG module includes correlating information that correlates the particular program contents with the program contents information, the related information, the tuning information and the like. The ECG module, configured with the program contents information and the correlating information in combination as the minimum unit thereof may further include optional information such as the related information and/or the tuning information. The ECG information in the ECG module includes identification information such as ID numbers that enable identification of specific ECG information, and may further optionally include attribute information, e.g., category information, indicating the attributes of the information included in the ECG information.

In the example presented in FIG. 4, the ECG module 10 related to the program contents A include program contents information 11 for that program contents A, link information 12 providing linkage to the ECG module 20 related to the program contents D, related information pertaining to the program contents A such as web site information 13, cast information 14, DVD (digital versatile disk) information 15, CD (compact disk) information 16 and catalog information 17, tuning information 18 and correlating information 19.

The ECG module assumes an executable metadata format, and as execution is initiated at the user terminal 200 or the television terminal 300, display of the individual sets of ECG information constituting the ECG module is controlled either in response to a user operation or automatically. In addition, sets of ECG information constituting different ECG modules can be correlated based upon the identification information assigned to the ECG information and the correlating information provided in the individual ECG modules so as to enable cross-referencing among a plurality of ECG modules.

For instance, the ECG module 10 related to the program contents A is first viewed in the example presented in FIG. 4. The ECG module 10 related to the program contents A includes the link information 12 providing linkage to the program contents D, which is related to the program contents A, and the link information 12 in the ECG module 10 includes identification information indicating program contents information 21 in the ECG module 20 corresponding to the program contents B.

As the link information 12 is selected by the user viewing the ECG module 10 for the program contents A, the viewing of the ECG module 10 for the program contents A is interrupted. Then, as the ECG module 20 related to the program contents D is obtained and executed, viewing of the program contents information 21 in the ECG module 20 for the program contents D starts. It is to be noted that if a return button or the like is operated in this state, the viewing of the ECG module 10 related to the program contents A resumes.

Next, a situation in which the ECG information containing cast information 22 in the ECG module 20 for the program contents D is selected is considered. Under these circumstances, if the identification information for the selected ECG information is included in correlating information 32 in the ECG module 30 for the program contents E, linkage to ECG information 31 in the ECG module 30 related to the program contents E is enabled. Thus, the user is able to view the ECG information included in the plurality of ECG modules correlated to one another through an intuitive operation.

As explained earlier, the program contents information and the related information used as the ECG information are based on program contents information provided by the contents providers 400 and the related information provided by the sponsors 500. At each contents provider 400, an enormous volume of program contents information that can be utilized as ECG information, such as EPG information, programming information, program contents format information, cue sheet information, program contents basic information, program contents production information, program contents logo-photo information, program promotion information, program sales information and rights information, is stored.

However, the program contents information is created and managed in reality by adopting diverse data formats and structures in correspondence to various program information types. In other words, it is difficult to create and manage program contents information to be utilized as ECG information with a uniform data format/structure and it is bound to require a great deal of labor to manage the existing program contents information by systematically indexing the program contents information into a tree structure. It is to be noted that similar challenges also exist with regard to the related information such as advertisement information and retail information stored at the sponsors 500.

Accordingly, a data structure such as that shown in FIG. 4 may be adopted to enable efficient management and utilization of the program contents information and the related information as ECG information. Such a data structure can be achieved by first collecting program contents information assuming diverse data formats and structures and managed accordingly, de-indexing and de-treeing the program contents information and thus splitting the program contents information into blocks of unit information.

Next, each block of unit information is processed into ECG information by appending identification information and also selectively appending attribute information, and the ECG information is incorporated into an ECG module related to a specific program contents by correlating the ECG information to the particular program contents based upon the correlating information. During this process, attribute information may be appended by automatically extracting a keyword contained in the unit information and automatically appending several sets of category information or the like as the attribute information based upon the extracted keywords.

In addition, related information is also incorporated as ECG information into the ECG module as necessary. For this purpose, search conditions in conformance to which related information such as advertisement information and retail information related to the program contents is to be searched are extracted from the program contents information. Next, in conformance to the search conditions, the relevant related information is searched from the existing advertisement information database, retail information database and the like, and the related information obtained through the search is processed into ECG information by appending identification information and also selectively appending attribute information to the related information. It is then incorporated into the ECG module related to the program contents by correlating the ECG information to the program contents based upon the correlating information.

Through this process, the information-providing service provider is able to organize the existing program contents information and related information into ECG modules related to program contents with a high level of efficiency without having to systematize the program contents information and the related information. In addition, the data structure assumed in the ECG modules allows the user to search for desired information through an intuitive operation instead of launching a logic-based search. Consequently, the program contents information and the related information stored at the contents providers 400 and the sponsors 500 can be provided as a highly convenient program contents navigation tool.

(ECG Gadgets)

Figure 5A:
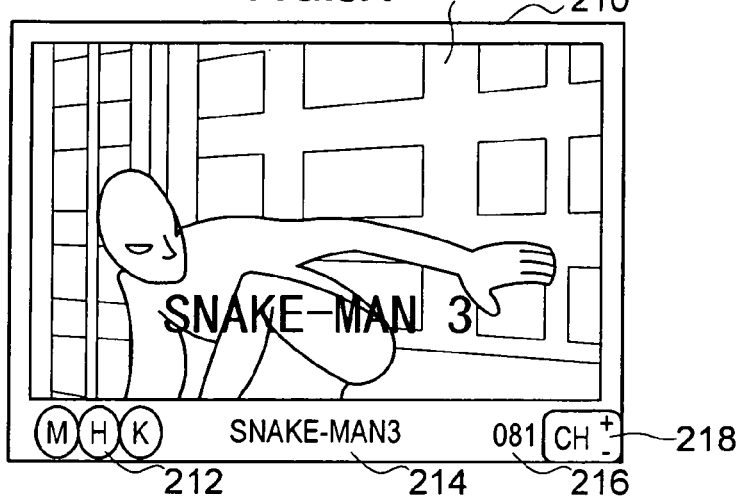
FIG. 5A presents an example of an ECG gadget.
Figure 5B:
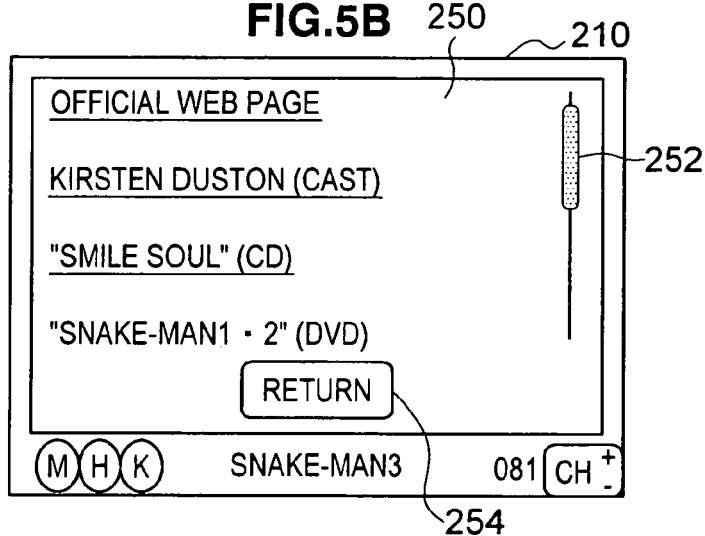
FIG. 5B presents an example of an ECG gadget.
Figure 5C:
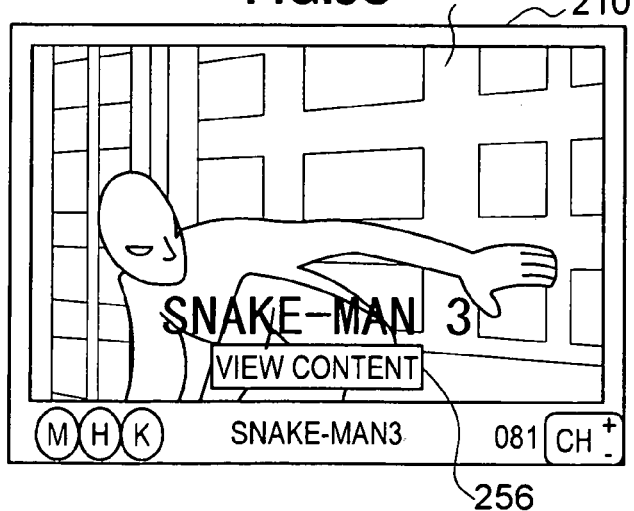
FIG. 5C presents an example of an ECG gadget.

FIGS. 5A through 5C illustrate an example of an ECG gadget that may be utilized at the user terminal 200. The ECG gadget in FIGS. 5A through 5C represents an example of an ECG gadget that is provided on the screen at the user terminal 200 (a personal computer in this example) and, more specifically, over a specific area of the screen.

While the following explanation focuses on an ECG gadget utilized at the personal computer, an ECG gadget utilized at another type of user terminal 200 such as a portable telephone or a remote controller for the television terminal 300, too, will have similar basic functions although it may adopt a different display mode or the like. In addition, an ECG gadget may be provided as part of a blog accessed via a personal computer, a portable telephone or the like. It is to be noted that the term "blog" refers to a web site having recorded therein memoranda, commentaries and the like in addition to the URL of a web page on the Web.

The ECG gadget in the example is constituted with ECG information included in an ECG module and is similar to the ECG module in that a plurality of correlated sets of ECG information is incorporated therein. The ECG gadget, provided from the ECG server 100, is utilized as an ECG module at the user terminal 200. In addition, the ECG gadget may be provided to the user terminal 200 after preprocessing ECG information in the ECG module at the ECG server 100, so as to optimize the ECG gadget to the processing capability of the user terminal 200, or the ECG gadget having been provided to the user terminal 200 may undergo preprocessing before it is utilized at the user terminal 200.

As shown in FIGS. 5A through 5C, the ECG information included in the ECG gadget is displayed in a gadget display area 250 within a display frame 210 where information such as a logo 212 of the contents provider 400, a title 214 of the program contents, a channel number 216 and the like is displayed. In the lower right corner of the display frame 210, a selector button 218, via which the ECG gadget channel (equivalent to the channel assigned to the ECG contents correlated to the ECG module) is switched, is displayed.

FIG. 5A shows an ECG gadget constituted with ECG information related to program contents "Snakeman 3" provided by the contents provider 400 "MHK" on channel "081" displayed over the gadget display area 250.

The ECG information displayed in the gadget display area 250 can be switched through a user operation so as to bring up on display specific desired ECG information included in the ECG gadget based upon the data structure assumed in the ECG gadget, which is similar to that of the ECG module described earlier. It is to be noted that in response to a specific user operation, ECG information in another ECG gadget linked with the current ECG gadget can be brought up on display as well.

Alternatively, the ECG information displayed in the gadget display area 250 may be automatically switched via the user terminal 200 so as to display the ECG information in the ECG gadget in a preset display order or in a random order.

FIG. 5B shows a display of a list of the ECG information included in the ECG gadget, provided in the gadget display area 250, which is brought up by switching from the ECG information display shown in FIG. 5A. A scrollbar 252 and a "return" button 254 are also displayed in the gadget display area 250. As the scrollbar 252 is operated up/down in the state shown in FIG. 5B, the ECG information in the gadget display area 250 is scrolled up/down. Then, as one of the ECG information is selected, the ECG information in the gadget display area 250 is switched to bring up the ECG information corresponding to the selected category. In addition, if the "return" button 254 is selected, the ECG information display in the gadget display area 250 is switched to bring up the ECG information that was previously on display.

FIG. 5C shows ECG information containing the tuning information on display, which is selected in the ECG information category list in FIG. 5B. In the gadget display area 250, a "view contents" button 256 is displayed to prompt the user to perform a channel selection operation to select the particular program contents. It is to be noted that the "view contents" button 256 is displayed only if the program contents are currently available for viewing at the television terminal 300. For this reason, the button may not be displayed while the user is viewing an ECG gadget related to other program contents instead of the program contents currently available for viewing. As the user selects the "view contents" button 256 in the state shown in FIG. 5C, the tuning information including the program contents tuning information "081" and the identification information corresponding to the ECG information currently on display are provided to the television terminal 300.

(Timing Information Setting Processing)

The ECG module related to specific program contents are provided from the ECG server 100 to the user terminal 200 in conformance to the timing information. The timing information set in each ECG module indicates specific timing corresponding to the time point before/after the program contents are provided and/or a time point while the program contents are being provided. For instance, assuming that the television program A is allocated to a program slot 19:00~19:30, the timing information set in the ECG module related to the program contents A may indicate spots 18:55~19:00 and 19:00~19:05. In addition, as an example of broader application, ECG modules may be created in correspondence to specific program raw material included in the program contents. In such a case, timing information indicating specific timing corresponding to a given time point while the program raw material is being provided may be set in the ECG module created for the program raw material. In more specific terms, the timing information set in the ECG module for a main program raw material 1 that constitutes the television program A and is allotted to a program slot 19:05~19:13 may indicate a spot 19:06~19:09.

FIG. 6 illustrates the timing information setting processing executed in the example of broader application. FIG. 6 presents an example of cue sheet information. It is to be noted that the cue sheet information indicates allocation of the program raw material, included in the program contents, to specific television program time slots.

The program raw material allocated to specific time slots in the cue sheet information for the program contents A shown in FIG. 6 include a "title raw material", a "CM1 raw material", a "CM2 raw material", a "main program contents raw material 1" a "CM3 raw material", a "CM4 raw material" a "program promotion 1 raw material", a "main program contents raw material 2", a CM5 raw material" a "CM6 raw material", a "program promotion 2 raw material" and an "ending raw material". In addition, the cue sheet information contains timing information indicating the timing with which an ECG module corresponding to a specific program raw material is to be provided within the time slot for the program contents unit, as well as the time slots for the program raw materials themselves. While FIG. 6 shows a single program raw material-related ECG module is assigned in correspondence to the time slot for the specific program raw material, a plurality of ECG modules may instead be assigned to the time slot. In addition, depending upon the nature of a given program raw material, a general-purpose ECG module as well as an ECG module related to the program raw material may be allocated.

The timing information is set in correspondence to each set of program contents based upon specific conditions such as the date/time at which the program contents are offered, the relevance of the particular program, the significance to current events and competing program contents available in the same time slot. For instance, by providing an optimal ECG module depending upon the date/time at which the program contents are provided and the competing program contents available during the same time slot or by providing an ECG module with significance to current events or novelty, the user may be more effectively enticed into viewing the program contents.

The timing information may be set based upon ratings information indicating the ratings of the program contents and/or similar program contents. Such ratings information may be sampled and collected every minute while the program contents are being shown by the contents provider or the like and they include both forecast information indicating the ratings predicted before the program is shown and history information obtained after the program has been shown.

Ratings information is affected by that date/time at which the program contents are provided, their entertainment value or their relevance to current events, competing programs available during the same time slot and the like. The ratings history information can be analyzed by eliminating variable factors such as the date/time at which the program contents are provided and competing program contents available in the same time slot, based upon the ratings history information corresponding to the particular program contents or similar program contents.

As a result, specific timing with which the ratings jump due to entertainment value, interest value or the like that attracted much user attention and caused a rise in the ratings can be pinpointed based upon the cue sheet information and the ratings history information. The cause of the rise in the ratings may be identified in correspondence to specific information indicating a scene, an advertised product or the like in the program contents. The information thus identified functions as trigger information that can be used to entice the user into viewing the program contents particularly effectively by piquing user interest.

An ECG module made up with ECG information related to specific program contents and provided in conformance to the timing information set based upon the specific conditions described above, effectively entices the user into viewing the program contents. In particular, the program contents-related ECG module provided with the timing with which the ratings are likely to jump, determined based upon the ratings forecast information and/or the ratings history information, is likely to entice the user into viewing the program contents even more effectively. Furthermore, by configuring an ECG module containing optional ECG information related to trigger information in correspondence to each set of program contents, the user can be enticed into viewing the program contents very efficiently.

(ECG Module Configuration Processing)

As described earlier, an ECG module constituted with ECG information related to specific program contents may also include optional ECG information related to trigger information such as a specific scene in the program contents or an advertised product.

An ECG module may be configured through the ECG module configuration method described earlier by extracting program contents information related to the program contents from the program contents information database and also by extracting related information related to the program contents from the related information database based upon the search conditions extracted from the program contents information. In addition, based upon the search conditions extracted from trigger information, program contents information and related information both related to the trigger information may be extracted from the program contents information database and the related information database as an option. The search conditions set for these purposes may be, for instance, the shooting location for the particular scene, the cast members in the scene, a product introduced in a related advertisement.

When configuring an ECG module containing related information, filter processing may be executed as part of a competing product check, so as to ensure that the ECG module will not include related information pertaining to another sponsor offering competing products or a sponsor of the program contents or the television program.

After undergoing the selective filter processing, the sets of program contents information and/or related information having been extracted are correlated via the correlating information based upon the identification information used to identify the ECG information and thus, an ECG module related to the program contents are configured.

The ECG module related to the program contents includes ECG information containing tuning information used to facilitate selection of the program contents at the television terminal 300. The tuning information includes channel information based upon which the contents provider 400 providing the program contents can be identified. The ECG information containing the tuning information may be, for instance, ECG information accompanied by message display prompting the user to perform the channel selection operation to select the program contents.

An ECG module related to the program contents, assuming the ECG module data structure having been described in reference to FIG. 4, can be selectively configured and reconfigured with ease at the ECG server 100 based upon the ratings information. In addition, the user is able to access the ECG information constituting program promotion information by viewing and searching for specific ECG information included in the ECG module having been configured/reconfigured based upon the ratings information.

(Linked Processing Via ECG Modules)

Figure 7:
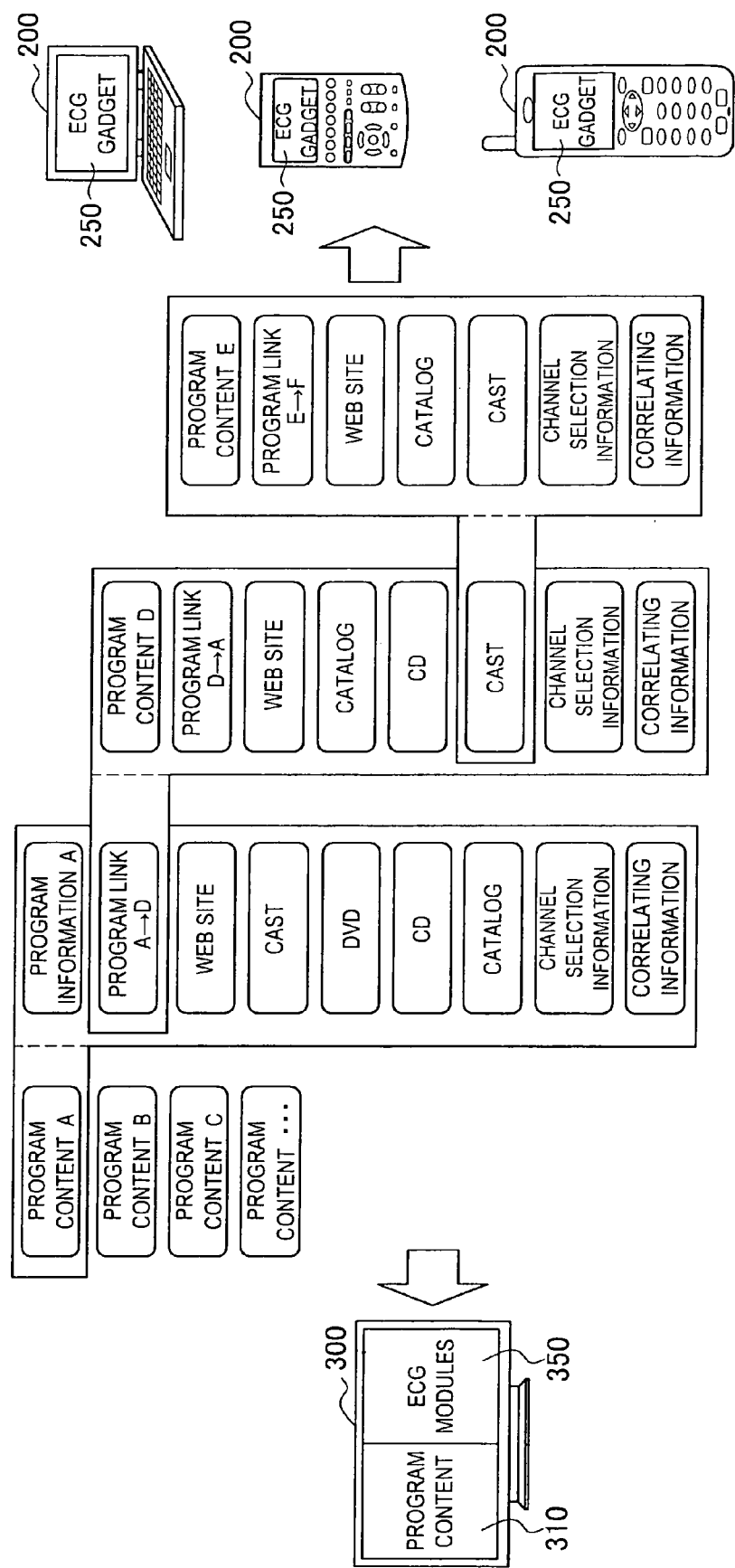
FIG. 7 is a conceptual illustration of the linked processing executed at the user terminal and the television terminal by using an ECG module.

FIG. 7 is a conceptual diagram illustrating linked processing executed at the user terminal 200 and the television terminal 300 by using ECG modules. As shown in FIG. 7, ECG information included in an ECG gadget is on display in the gadget display area 250 at the user terminal 200. The program contents are on display in a program contents display area 310 ECG information included in the ECG module is displayed over an ECG module display area 350. Linked processing is executed at the user terminal 200 and the television terminal 300 as they exchange the tuning information and the identification information in response to user operation performed on the ECG module (gadget).

Tuning processing is executed as first linked processing at the television terminal 300, based upon the tuning information included in the ECG gadget and provided from the user terminal 200 to the television terminal 300 in response to the user operation. The ECG module functions as a tool with which the program promotion information is provided to the user in a timely manner and also as a tool for smoothly guiding the user viewing the program promotion information to a channel selection operation by providing the tuning information as part of the ECG module to the user viewing the ECG information. As a result, the ratings for the program contents can be improved efficiently.

ECG information display control processing is executed as second linked processing so as to display at the television terminal 300 the ECG information corresponding to the ECG information identification information in the ECG gadget provided from the user terminal 200 to the television terminal 300 in response to the user operation. It is to be noted that when ECG information identification information used to identify specific ECG information is provided from the television terminal 300 to the user terminal 200, too, similar display control processing can be executed at the user terminal 200. Thus, the ECG information display at both the user terminal 200 and the television terminal 300 can be switched under control executed via the common ECG module (gadget). In other words, the ECG module functioning as a program contents navigation tool does at both the user terminal 200 and the television terminal 300 ensures that the user is provided with easily searched and accessed program contents promotion information. Consequently, the program contents can be selected with greater ease and convenience.

(Flow of the Information Providing Method)

Figure 8:
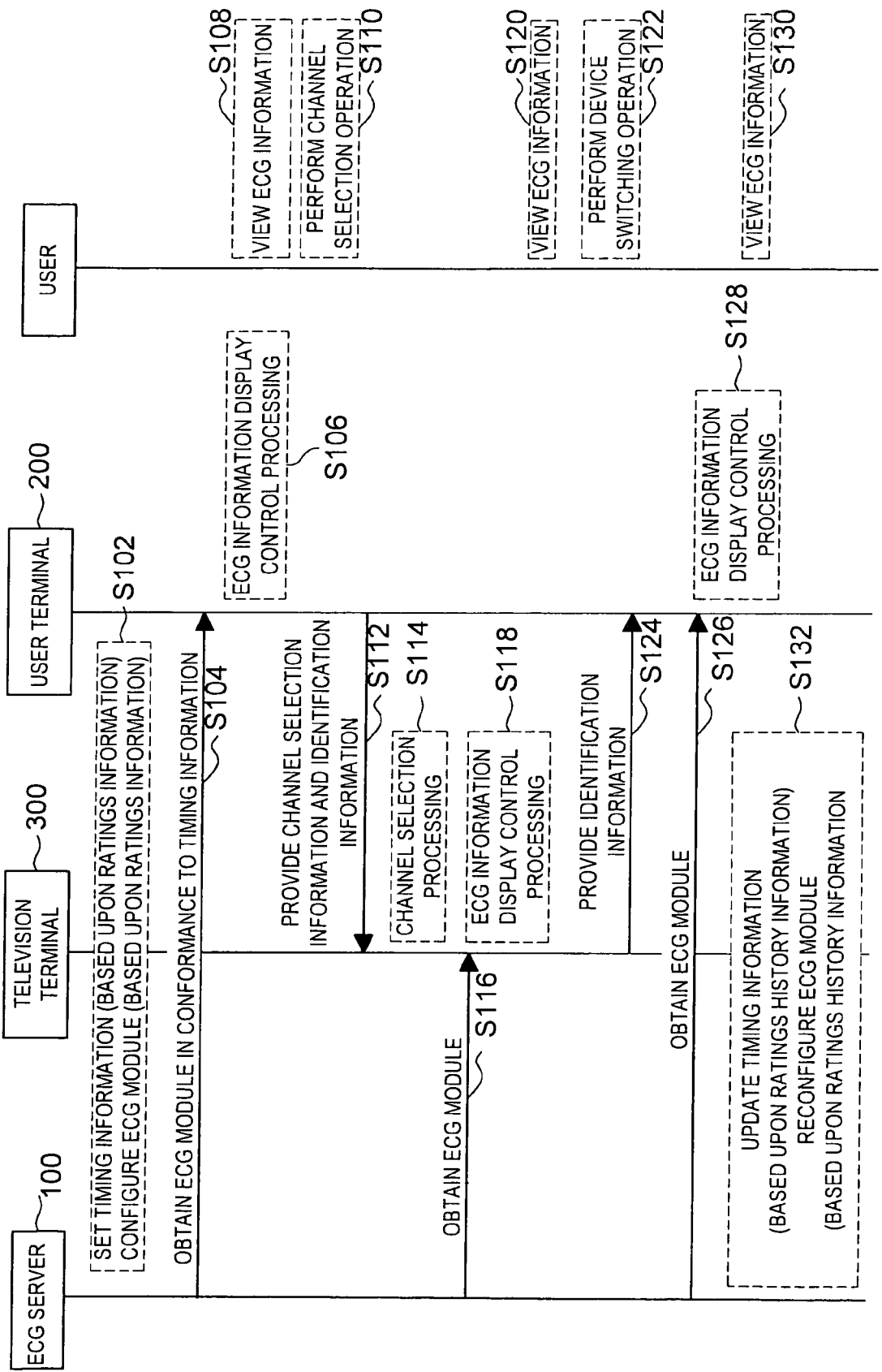
FIG. 8 presents a flowchart of the processing executed by adopting the information providing method.
Figure 9:
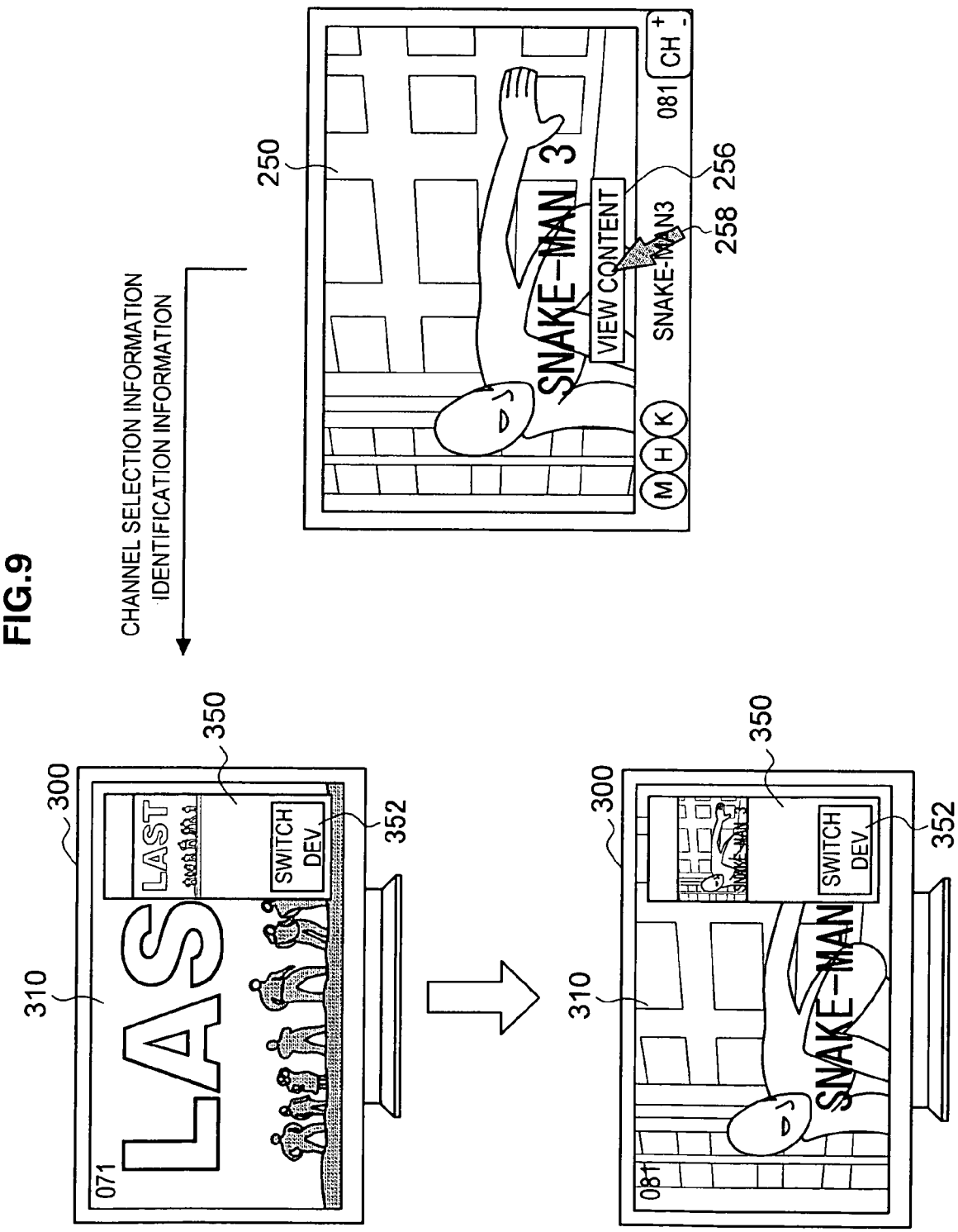
FIG. 9 illustrates the information providing method shown in FIG. 8 in more specific detail.
Figure 10:
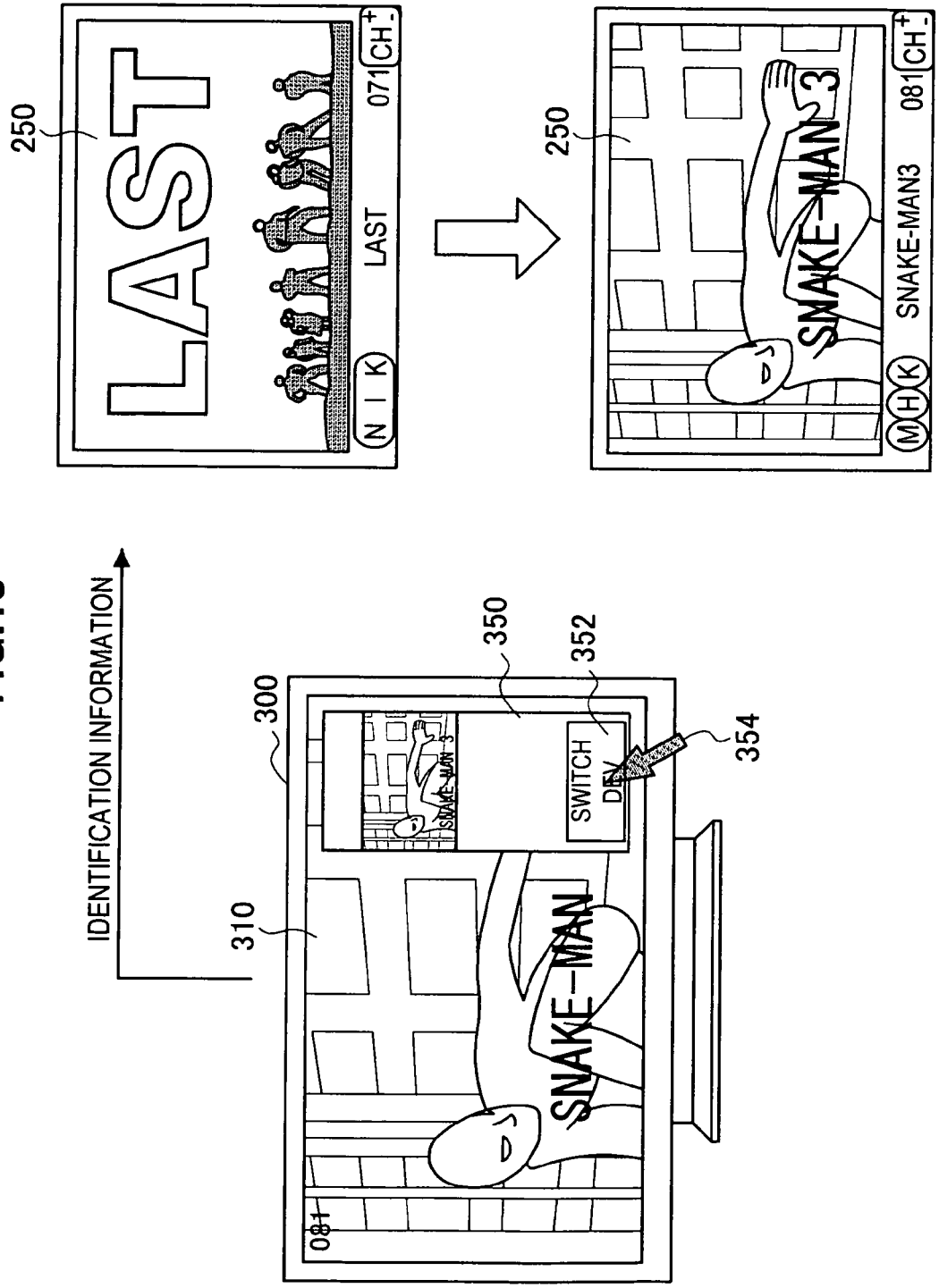
FIG. 10 illustrates the information providing method shown in FIG. 8 in more specific detail.

In reference to FIGS. 8 through 10, the information providing method achieved in the embodiment is described below. FIG. 8 presents a flowchart of the information providing method. FIGS. 9 and 10 each illustrate specifically how information may be provided through the information providing method shown in FIG. 8.

As explained earlier in reference to FIG. 6, the ECG server 100 provides an ECG module to the user terminal 200 by interlocking with consignment of the program contents from the contents provider 400 in conformance to the timing information having been set based upon the pre-determined conditions described earlier and/or the ratings information. The ECG module is configured so as to include ECG information related to the program contents and/or optional ECG information related to trigger information specified based upon the ratings information (S102).

At the user terminal 200, the ECG module is obtained in conformance to the timing information (S104) and display control is executed to display ECG information included in the ECG module (gadget) (S106). It is to be noted that the ECG information included in the ECG module may have undergone preprocessing at the ECG server 100 and/or the user terminal 200 before it is utilized at the user terminal.

The ECG gadget, which includes ECG information configured so as to pique the user's interest, is provided in conformance to the timing information, and thus functions as a tool for providing program promotion information that makes it possible to entice the user into viewing the program contents with a high level of efficiency.

Through this process, the contents provider 400 is able to provide the user with the ECG information constituting program promotion information in a mode that allows easy access by the user with the optimal timing. The user, for his part, is able to easily access the ECG information constituting the program promotion information provided in a timely manner.

Upon deciding to view the program contents, the user viewing the ECG information at the user terminal 200 (S108) performs a channel selection operation based upon the tuning information included in the ECG gadget (S110). In response to the channel selection operation performed by the user, the tuning information and the identification information corresponding to the ECG information currently on display are provided from the user terminal 200 to the television terminal 300 (S112).

Upon obtaining the channel selection information and the identification operation, the television terminal 300 executes tuning processing based upon the tuning information (S114) and thus receives the program contents from the contents provider 400. In addition, the television terminal 300 obtains the ECG module related to the selected program contents from the ECG server 100 (or may already have obtained them from the ECG server) (S116), and executes ECG information display control processing (S118) so as to display the ECG information corresponding to the identification information among the sets of ECG information included in the ECG module.

FIG. 9 presents an example of the tuning processing. Prior to the tuning processing, program contents "LAST" currently available on channel "071" are displayed in the contents display area 310 and ECG information included in the ECG module related to the particular program contents are displayed in the unit display area 350 at the television terminal 300. At the user terminal 200, on the other hand, ECG information included in the ECG gadget related to program contents "Snakeman 3" currently available on channel "081" is displayed in the gadget display area 250. In addition, "view contents" button 256 constituting part of the ECG information is displayed at the user terminal 200.

As the "view contents" button 256 is selected with a pointer 258 or the like, the user terminal 200 provides the tuning information including the channel information "081" in the ECG gadget currently on display and the identification information for the ECG information currently on display to the television terminal 300. Upon obtaining the tuning information and the identification information, the television terminal 300 executes tuning processing based upon the tuning information and executes display control processing to control ECG information display based upon the identification information. Through this process, the program contents "Snakeman 3" currently available on channel "081" and the ECG information included in the ECG module related to the program contents are brought up on display at the television terminal 300.

The ECG gadget includes the tuning information used to allow the program contents to be selected with ease at the television terminal 300 and this tuning information is provided to the television terminal 300 in response to a user operation performed at the user terminal 200. In other words, the ECG gadget functions as a tool for guiding the user viewing the program promotion information to the channel selection operation smoothly.

The method enables the contents provider 400 to prompt the user to perform the channel selection operation based upon the tuning information and entice the user into viewing the program contents with a high level of efficiency. It also allows the user to easily select and view the program contents simply by performing the channel selection operation based upon the tuning information. In addition, the ECG information having been on display at the user terminal 200 can then be brought up on display at the television terminal 300 so that the user can view it at the television terminal.

The user viewing the ECG information at the television terminal 300 (S120) may switch ECG information viewing devices through a switching operation. In response to the switching operation (S122) performed by the user, the television terminal 300 provides the identification information for the ECG information currently up on display to the alternative device, i.e., the user terminal 200 (S124).

It is to be noted that while the ECG information viewing device changeover in this example is effected so that the ECG information viewing device is switched from the television terminal 300 to the user terminal 200, i.e., the provider of the tuning information, the information providing system may instead be configured so as to select another user terminal 200 as the ECG information viewing device. In such a case, the television terminal 300 may transmit the identification information to a user terminal 200 present within its communication-enabled range and the ECG information corresponding to the identification information may be viewed at the user terminal 200 having obtained the identification information.

Upon obtaining the identification information, the user terminal 200 obtains (or may have already obtained) the ECG gadget from the ECG server 100 (S126) and executes ECG information display control processing (S128) so as to display the ECG information corresponding to the identification information among the sets of ECG information in the ECG gadget. Through this processing, the ECG information having been on display at the television terminal 300 can then be brought up on display at the user terminal 200 so that the user can view it at the user terminal (S130).

FIG. 10 presents an example of the switch-over processing. Prior to the switch-over processing, ECG information included in the ECG gadget related to the program contents "LAST" currently available on channel "071" is displayed in the gadget display area 250 of the user terminal 200. At the television terminal 300, on the other hand, the program contents "Snakeman 3" currently available on channel "081" are displayed in the contents display area 310 and ECG information included in the ECG module related to the program contents are displayed in the unit display area 350. At the television terminal 300, a "DEV switch" button 352 constituting part of the ECG information is also displayed.

As the "DEV switch" button 352 is selected via a pointer 354 or the like, the television terminal 300 provides the identification information for the ECG information currently on display to the user terminal 200. Upon obtaining the identification information, the user terminal 200 executes ECG information display control processing based upon the identification information. Namely, the user terminal 200 executes ECG information display control processing so as to display the ECG information corresponding to the identification information, among the sets of ECG information included in the ECG gadget related to the program contents "Snakeman 3" currently available on channel "081".

The ECG server 100 is capable of updating the timing information based upon the specific conditions such as those described earlier and/or the ratings history information provided from the contents provider 400 or the like, after the program contents are provided. The ECG server 100 is also capable of reconfiguring the ECG module based upon the specific conditions described earlier and/or the ratings history information (S132).

Consequently, the contents provider 400 is able to further enhance the effectiveness of the ECG information as a promotional tool by reflecting the most recent ratings history information in the ECG module configuration and/or in the timing information. The user, for his part, is able to perform the channel selection operation more efficiently based upon the reconfigured ECG module provided in conformance to the updated timing information.

As described above, the ECG module related to specific program contents are provided from the ECG server 100 to the user terminal 200, allowing the user to easily access the ECG information constituting the program promotion information through the information providing system achieved in the embodiment. In addition, since the ECG module is provided to the user terminal 200 in conformance to the timing information by linking with consignment of the program contents to the television terminal 300, the program promotion information can be provided to the user with the optimal timing. Since the program contents tuning information is provided as part of the ECG module, the user prompted to perform the channel selection operation based upon the tuning information is enticed into viewing the program contents with a high level of efficiency.

As a result, with the issues in the related art concerning access to program promotion information, the timing with which the program promotion information is provided and the channel selection operation by the user effectively addressed, the program contents ratings can be improved and better convenience are assured for the user wishing to select the program.

Although a preferred embodiment of the present invention is described in the foregoing with reference to the drawings, the present invention is not limited thereto. It should be understood by those skilled in the art that various modifications, combinations, sub-combinations and alterations may occur depending upon design requirements and other factors insofar as they are within the scope of appended claims or equivalents thereof.

What is claimed is:

1. An information providing apparatus that is capable of connecting via a communication network with a broadcast information reception terminal, which obtains and displays program contents and program contents-related electronic contents guide (ECG) information related to the program contents, and with an information acquisition terminal, which obtains and displays the program contents-related ECG information, and provides said program contents-related ECG information to said broadcast reception terminal and said information acquisition terminal, comprising:
an ECG information storage unit that stores said program contents-related ECG information in correspondence to the program contents;
an ECG module configuring unit that configures an ECG module in correspondence to the program contents, made up with a plurality of sets of ECG information including ECG information containing tuning information to be used to allow said broadcast reception terminal to select the program contents;
a timing information setting unit that sets timing information, which will allow said ECG module corresponding to the program contents to be provided to said information acquisition terminal by linking with consignment of the program contents to said broadcast reception terminal; and
an ECG module providing unit that provides, in conformance to said timing information, said ECG module corresponding to the program contents to said information acquisition terminal capable of providing said tuning information to said broadcast reception terminal,
wherein the ECG module includes correlating information, and when ECG information of an other ECG module is selected and identification information of the selected ECG information is included in the correlation information, then linkage between the ECG module and the other ECG module is enabled.

2. An information providing apparatus according to claim 1, wherein:
said ECG module includes a plurality of sets of ECG information and correlating information that correlates said plurality of sets of ECG information to the program contents, and is configured to enable display control for said plurality of sets of ECG information through user operation performed at said information acquisition terminal and at said broadcast reception terminal.

3. An information providing apparatus according to claim 2, wherein:
said timing information setting unit sets said timing information based upon ratings information pertaining to the program contents.

4. An information providing apparatus according to claim 2, wherein:
said ECG module configuring unit configures said ECG module related to the program contents based upon ratings information pertaining to the program contents.

5. An information providing apparatus according to claim 3, wherein:
said timing information setting unit updates said timing information based upon ratings history information pertaining to the program contents.

6. An information providing apparatus according to claim 3, wherein:
said ECG module configuring unit reconfigures said ECG module based upon ratings history information pertaining to the program contents.

7. An information providing apparatus according to claim 1, further comprising:
an ECG information pre-processing unit that pre-processes ECG information included in said ECG module before providing said ECG module, so as to optimize said ECG module to the processing capability of said information acquisition terminal to which said ECG module is to be provided.

8. An information acquisition terminal that is included in an information providing system allowing a broadcast reception terminal, which obtains and displays program contents and program contents-related electronic contents guide (ECG) information related to the program contents, and said information acquisition terminal to connect via a communication network with an information providing apparatus offering said program contents-related ECG information and displays said program contents-related ECG information obtained from said information providing apparatus, comprising:
- an ECG module acquisition unit that obtains from said information providing apparatus an ECG module made up with a plurality of sets of ECG information, which include ECG information containing tuning information to be used to allow said broadcast reception terminal to select the program contents, in conformance to timing information set so as to provide said ECG module to said information acquisition terminal by linking with consignment of the program contents to said broadcast reception terminal;
- a display control unit that controls display of the ECG information in said ECG module having been obtained; and
- a tuning information providing unit that provides, in response to a user operation, tuning information included in said ECG module to said broadcast reception terminal capable of selecting the program contents based upon the tuning information,
- wherein the ECG module includes correlating information, and when ECG information of an other ECG module is selected and identification information of the selected ECG information is included in the correlation information, then linkage between the ECG module and the other ECG module is enabled.

9. An information acquisition terminal according to claim 8, wherein:
- said ECG module includes a plurality of sets of ECG information and correlating information used to correlate said plurality of sets of ECG information to the program contents and is configured so as to enable said display control unit to control display of said plurality of sets of ECG information in response to a user operation.

10. An information acquisition terminal according to claim 9, further comprising:
- an identification information acquisition/providing unit that obtains from said broadcast reception terminal identification information used to identify ECG information currently under display control at said broadcast reception terminal and provides identification information used to identify ECG information currently under display control by said display control unit to said broadcast reception terminal capable of controlling display of ECG information corresponding to said identification information in response to a user operation, wherein:
- said display control unit to control display of the ECG information corresponding to said identification information having been obtained.

11. An information acquisition terminal according to claim 8, further comprising:
- an ECG information preprocessing unit that preprocesses ECG information included in said ECG module having been obtained so as to optimize said ECG module to the processing capability of said information acquisition terminal, before executing display control for said ECG information in said ECG module.

12. A broadcast reception terminal that is included in an information providing system allowing an information acquisition terminal, which obtains and displays electronic contents guide (ECG) information from an information providing apparatus, and said broadcast reception terminal to connect via a communication network with said information providing apparatus offering program contents-related ECG information related to program contents and displays program contents and ECG information related to the program contents, comprising:
- an ECG module acquisition unit that obtains from said information providing apparatus an ECG module related to the program contents and made up with a plurality of sets of ECG information including ECG information containing tuning information to be used to allow said broadcast reception terminal to select the program contents;
- a tuning information acquisition unit that obtains in response to a user operation performed at said information acquisition terminal tuning information included in an ECG module, which is provided from said information providing apparatus to said information acquisition terminal in conformance to timing information set so as to provide said ECG module to said information acquisition terminal by linking with consignment of the program contents to said broadcast reception terminal;
- a program contents tuning unit that selects the program contents based upon said tuning information having been obtained; and
- a display control unit that controls display of the program contents and ECG information included in said ECG module obtained from said information providing apparatus,
- wherein the ECG module includes correlating information, and when ECG information of an other ECG module is selected and identification information of the selected ECG information is included in the correlation information, then linkage between the ECG module and the other ECG module is enabled.

13. A broadcast reception terminal according to claim 12, wherein:
- said ECG module includes a plurality of sets of ECG information and correlating information used to correlate said plurality of sets of ECG information to the program contents and is configured so as to enable said display control unit to control display of said plurality of sets of ECG information in response to a user operation.

14. A broadcast reception terminal according to claim 13, further comprising:
- an identification information acquisition/providing unit that obtains from said information acquisition terminal identification information used to identify ECG information currently under display control at said information acquisition terminal and provides identification information used to identify ECG information currently under display control by said display control unit to said information acquisition terminal capable of controlling display of ECG information corresponding to said identification information in response to a user operation, wherein:
- said display control unit controls the display of said ECG information corresponding to said identification information having been obtained.

15. An information providing system allowing an information acquisition terminal, which obtains and displays program contents-related electronic contents guide (ECG) information related to program contents, and a broadcast reception terminal, which obtains and displays said program contents and said program contents-related ECG information, to connect via a communication network with an information providing apparatus offering said program contents-related ECG information, wherein:
- said information providing apparatus comprises:
- an ECG information storage unit that stores said program contents-related ECG information in correspondence to the program contents;
- an ECG module configuring unit that configures an ECG module in correspondence to the program contents, made up with a plurality of sets of ECG information including ECG information containing tuning information to be used to allow said broadcast reception terminal to select the program contents;

a timing information setting unit that sets timing information which will allow said ECG module corresponding to the program contents to be provided to said information acquisition terminal by linking with consignment of the program contents to said broadcast reception terminal; and an ECG module providing unit that provides, in conformance to said timing information, said ECG module corresponding to the program contents to said information acquisition terminal capable of providing said tuning information to said broadcast reception terminal;

said information acquisition terminal comprises:

an ECG module acquisition unit that obtains said ECG module from said information providing apparatus in conformance said timing information;

a display control unit that controls display of ECG information in said ECG module having been obtained; and a tuning information providing unit that provides said tuning information included in said ECG module having been obtained to said broadcast reception terminal in response to a user operation; and a broadcast reception terminal comprises:

an ECG module acquisition unit that obtains said ECG module from said information providing apparatus;

a tuning information acquisition unit that obtains said tuning information in response to a user operation performed on said information acquisition terminal;

a program contents tuning unit that selects the program contents based upon said tuning information having been obtained; and a display control unit that controls display of the program contents and ECG information included in said ECG module having been obtained, wherein the ECG module includes correlating information, and when ECG information of an other ECG module is selected and identification information of the selected ECG information is included in the correlation information, then linkage between the ECG module and the other ECG module is enabled.

16. An information providing method adopted in an information providing system allowing an information acquisition terminal, which obtains and displays program contents-related electronic contents guide (ECG) information related to program contents, and a broadcast reception terminal, which obtains and displays the program contents and said program contents-related ECG information, to connect via a communication network with an information providing apparatus offering said program contents-related ECG information, comprising:

steps, executed at said information providing apparatus where said program contents-related ECG information are stored in correspondence to the program contents, of;

configuring an ECG module corresponding to the program contents and made up with a plurality of sets of ECG information including ECG information containing tuning information used to allow said broadcast reception terminal to select the program contents;

setting timing information in conformance to which said ECG module corresponding to the program contents are to be provided to said information acquisition terminal by linking with consignment of the program contents to said broadcast reception terminal; and providing said ECG module corresponding to the program contents in conformance to said timing information to said information acquisition terminal capable of providing said tuning information to said broadcast reception terminal, wherein the ECG module includes correlating information, and when ECG information of an other ECG module is selected and identification information of the selected ECG information is included in the correlation information, then linkage between the ECG module and the other ECG module is enabled.

17. A non-transitory computer-readable medium storing a computer-readable program enabling a computer to execute an information providing method adopted in an information providing system allowing an information acquisition terminal, which obtains and displays program contents-related electronic contents guide (ECG) information related to program contents, and a broadcast reception terminal, which obtains and displays said program contents and said program contents-related ECG information, to connect via a communication network with an information providing apparatus offering said program contents-related ECG information, the program comprising:

Steps, executed at said information providing apparatus where said program contents-related ECG information are stored in correlation to the program contents, of;

configuring an ECG module corresponding to the program contents and made up with a plurality of sets of ECG information including ECG information containing tuning information used to allow said broadcast reception terminal to select the program contents;

setting timing information in conformance to which said ECG module corresponding to the program contents are to be provided to said information acquisition terminal by linking with consignment of the program contents to said broadcast reception terminal; and providing said ECG module corresponding to the program contents in conformance to said timing information to said information acquisition terminal capable of providing said tuning information to said broadcast reception terminal, wherein the ECG module includes correlating information, and when ECG information of an other ECG module is selected and identification information of the selected ECG information is included in the correlation information, then linkage between the ECG module and the other ECG module is enabled.

* * * * *